United States Patent [19]

Clark

[11] Patent Number: 5,507,275
[45] Date of Patent: Apr. 16, 1996

[54] SOLAR SHOWER

[75] Inventor: Gregory M. Clark, Westport, Conn.

[73] Assignee: Solar Shower Partnership, New Canaan, Conn.

[21] Appl. No.: 391,007

[22] Filed: Feb. 21, 1995

[51] Int. Cl.⁶ ........................................................ F24J 2/46
[52] U.S. Cl. ............................ 126/627; 126/640; 126/591; 4/598
[58] Field of Search ........................... 126/591, 592, 126/640, 641, 642, 624, 704, 400, 583, 598, 599

[56] References Cited

U.S. PATENT DOCUMENTS

| D.323,703 | 2/1992 | Bianco . |
| D.337,815 | 7/1993 | Yoshida . |
| D.339,860 | 9/1993 | Hildebrand . |
| 1,042,418 | 10/1912 | Evans . |
| 1,372,598 | 3/1921 | Buka . |
| 2,007,426 | 7/1935 | Harris . |
| 3,513,828 | 11/1968 | Masters . |
| 4,143,644 | 3/1979 | Heitland et al. . |
| 4,318,763 | 5/1983 | Kahl . |
| 4,355,629 | 10/1982 | Cornell, III .................. 126/640 |
| 4,471,759 | 9/1984 | Anderson et al. . |
| 4,520,793 | 6/1985 | Hall . |

FOREIGN PATENT DOCUMENTS

| 2724708 | 12/1978 | Germany ........................... 4/598 |
| 2842416 | 4/1980 | Germany ........................... 4/598 |
| 676746 | 2/1991 | Switzerland ....................... 4/598 |
| 1301853 | 1/1973 | United Kingdom ............. 4/598 |
| WO87/05351 | 9/1987 | WIPO ................................ 4/598 |

OTHER PUBLICATIONS

"Hammacher Schlemmer" Summer 1993 Catalog, p. 2, Portable Shower Cabana.

Primary Examiner—James C. Yeung
Attorney, Agent, or Firm—St. Onge Steward Johnston & Reens

[57] ABSTRACT

A reservoir for storing and solar-heating water, a shower head, and means in fluid communication between said reservoir and said shower head for adjusting a temperature of water leaving said shower head. The shower preferably includes a source of temperature-blending water, such as a hose, for pressurizing the reservoir. The reservoir preferably comprising a one-piece, unitary sphere.

18 Claims, 2 Drawing Sheets

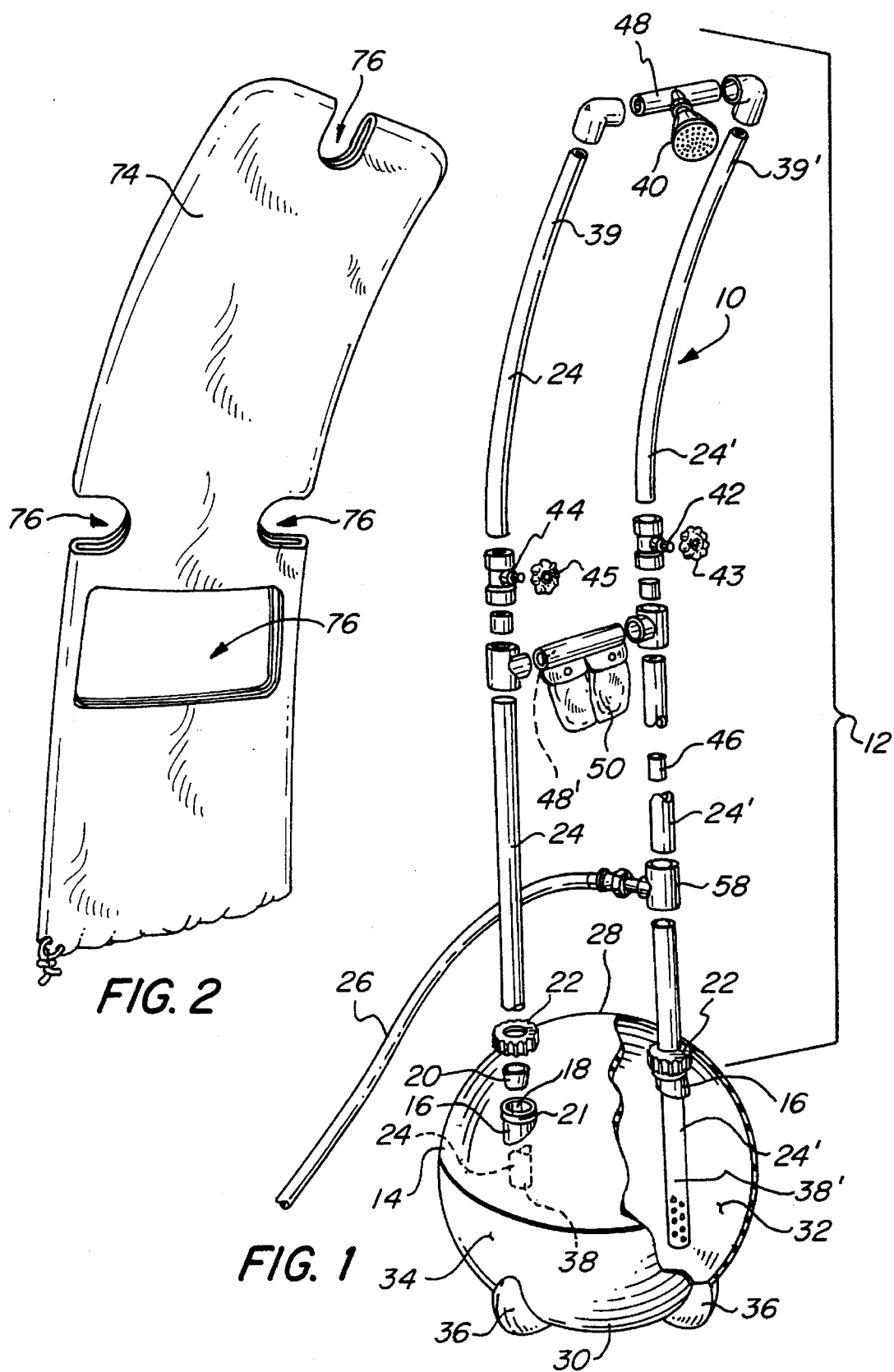

SOLAR SHOWER

FIELD OF THE INVENTION

The invention relates to solar-heated water showers, and more specifically to freestanding, portable solar-heated water showers.

BACKGROUND OF THE INVENTION

Solar water heaters are well known and include many different features. Some devices convert solar energy to electricity and then use the electricity to heat water. Others, such as those disclosed in U.S. Patent Nos. 4,471,759, 4,381,763, 4,143,644, 3,513,828 and 1,042,418 heat water radiantly. The water is typically thinly spread over a large, substantially flat surface area within a container having an opaque backing. The backing is usually black in color and functions as an absorber. The absorber is warmed by the sun and radiates heat to the water.

Portable showers are known. One such device, disclosed in U.S. Pat. No. 1,372,598, includes a fuel burning water heater and a hand pump. This is a rather large and bulky device which is portable only in the sense that it does not rely upon municipal water or power for operation.

Other devices disclosed in U.S. Pat. Nos. Des. 337,815 and 339,860 do not appear to disclose any water heating means. The '815 patent appears to disclose a battery pack and immersion pump and '860 patent does not appear to disclose any means for pumping water from tank to shower head. Temperature control in these devices is apparently only possible by monitoring the temperature of water in the sump and/or tank. Water temperature apparently may not be changed during a shower.

Solar-heated water showers are also known. Two such devices are disclosed in U.S. Pat. No. Des. 323,703 and U.S. Pat. No. 4,520,793. The '703 patent only discloses ornamental aspects of the shower and not operational details. The '703 patent does not disclose, for example, how or where water is heated, stored or pumped to the shower head. It is believed by Applicant, who has seen a photo of this device installed, that the device 1) is intended for permanent installation and connection to a municipal or other pressurized water supply, and 2) includes a single water line extending between heated water storage and the shower head. The '703 device apparently is not intended to be portable and includes no capability for controlling water temperature during a shower.

The '793 patent discloses a portable bag type solar water heater which may be hung for use as a gravity shower. There is no capability for controlling water temperature during a shower. As with other gravity showers, water pressure in the '793 device is generally much lower than is desired by typical users. Also, water pressure declines over the course of the shower.

What is desired, therefore, is a solar-heated water shower which provides ample water pressure and permits adjustment of water temperature during a shower, while also being easily portable and of relatively simple construction.

SUMMARY OF THE INVENTION

Accordingly, it is an object of the invention to provide a solar-heated shower which permits adjustment of water temperature.

It is a further object of the invention to provide a solar-heated shower which provides ample water pressure.

It is another object of the invention to provide a solar-heated shower of the type described above which is portable.

It is still another object of the invention to provide a solar-heated shower of the type described above which includes a showerhead for mixing solar-heated water and temperature-blending water.

It is yet another object of the invention to provide a solar-heated shower of the type described above including a valve for adjusting a rate of flow of temperature-blending water.

It is yet a further object of the invention to provide a solar-heated shower of the type described above wherein both the solar-heated and temperature blending water lines are pressurized by temperature-blending water.

Still a further object of the invention to provide a solar-heated shower of the type described above wherein pressurized temperature-blending water is provided by a hose.

The solar shower of the invention comprises a reservoir for storing and solar-heating water, a shower head, and means in fluid communication between said reservoir and said shower head for adjusting a temperature of water leaving said shower head. The shower preferably includes a source of temperature-blending water, such as a hose, for pressurizing the reservoir. The reservoir preferably comprises a one-piece, unitary sphere.

The temperature adjusting means preferably comprises a valve between the hose and the shower head for controlling a rate of flow of water from the hose to the shower head. The temperature adjusting means also preferably comprises a first conduit for connecting the reservoir and the showerhead in fluid communication. A second conduit connects the hose to the showerhead and the reservoir.

The first conduit preferably includes a valve for controlling a rate of flow of water from the reservoir to the shower head to adjust the shower water temperature and pressure, the first conduit having a first end for removing water from a top of the reservoir. The second conduit preferably includes a restrictor valve mounted between the hose and the valve to prevent adjustment of the valve from deleteriously reducing pressure in the first conduit. The second conduit has a first end for adding water to a bottom of the reservoir. The first end of the second conduit has a plurality of holes in the side wall for distributing water through the reservoir bottom.

The invention and its particular features and advantages will become more apparent from the following detailed description considered with reference to the accompanying drawings.

BRIEF DESCRIPTION OF THE DRAWINGS

FIG. 1 is a partially-exploded, partially cut-away front isometric view of a solar shower in accordance with the invention.

FIG. 2 is a front isometric view of a sleeve for fitting over a frame portion of the solar shower of FIG. 1 to customize it.

DETAILED DESCRIPTION OF THE INVENTION

Figure 3:
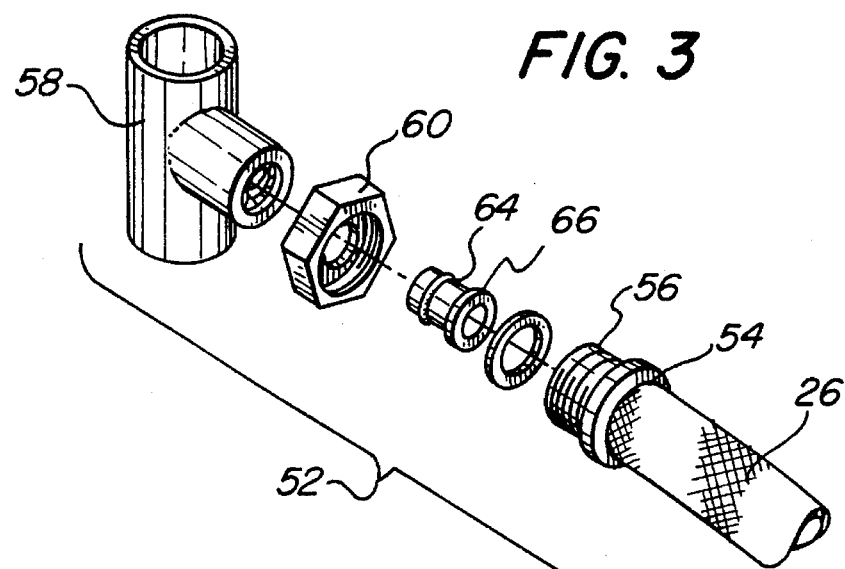
FIGS. 3 and 4 are exploded views of portions of the solar shower of FIG. 1 illustrating the detachable mounting of the shower head frame to the reservoir, and a pressurized water source to the shower head frame.

FIG. 1 depicts a solar shower 10 in accordance with the invention. FIG. 1 is a partially-exploded, partially cut-away view illustrating the components of shower 10 and their assembly.

Shower 10 generally comprises a frame portion 12 and a reservoir portion 14. Frame 12 is detachably mountable to reservoir 14 at ports 16 such that the two portions may be relatively quickly and easily separated to transport shower 10.

Figure 4:
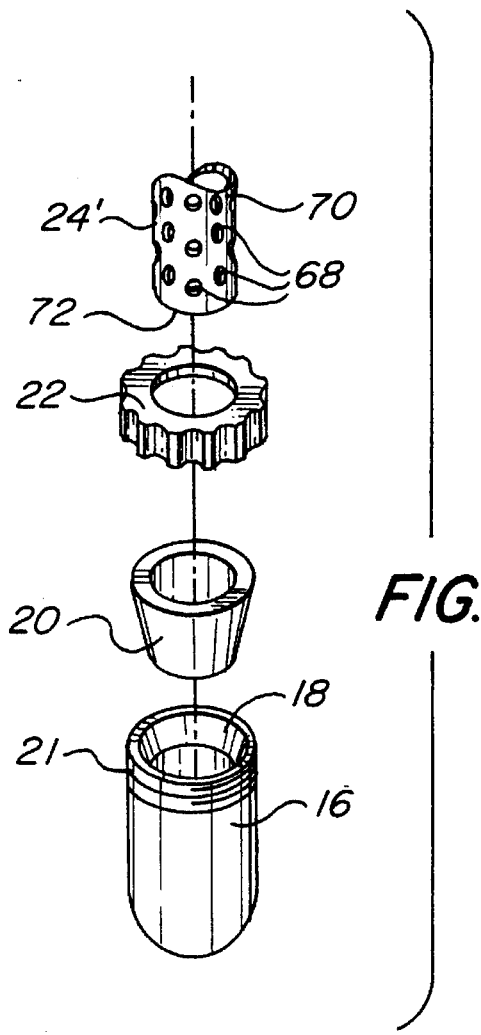

Ports 16 are tubular extensions integrally connected as one piece with reservoir 14. Referring now also to FIG. 4, ports 16 include a sloping inner land 18 for receiving an outer surface of a rubber or the like frustoconical washer 20, and an outer thread 21 for receiving a clamp ring 22 thereon in screw engagement.

To assemble frame 12 to reservoir 14, the clamp rings 22 and then the frustoconical washers 20 are placed onto water conduits 24, 24', the conduits are placed into ports 16, and clamp rings 22 are tightened onto the ports to compress and seal washers 16 against lands 18 and conduits 24, 24'. Disassembly may be achieved simply by unscrewing clamp rings 22. It is understood that washers 20 may be fitted around conduits 24, 24' in an interference fit which would both improve the seal and reduce the risk that the washers and clamp rings would get lost upon disassembly of shower 10.

Referring again to FIG. 1, reservoir 14 serves as a receptacle to store and solar-heat water supplied by pressurized source 26. Preferably, reservoir 14 is of a one piece unitary construction such as spin molding to provide fairly uniform wall thicknesses of sufficient strength to withstand municipal water pressures of between about 30–60 psi without leaking or deformation. Other methods of construction, such as ultrasonic welding of two reservoir halves, may also be used. The reservoir is also preferably spherical to substantially limit pressure points.

Reservoir 14 includes a top portion 28 and a bottom portion 30. Top portion 28 is preferably translucent, and most preferably transparent, for penetration of solar energy into the stored water while bottom portion 30 is preferably dark, and most preferably black, for absorption of solar energy for radiant heating of stored water.

As water is heated near the bottom of reservoir 14 it rises toward the top creating a convection current which substantially uniformly heats all of the water in the reservoir. This provides an advantage over prior art opaque reservoirs in which only water near the top is radiantly heated since water at the bottom of the reservoir is effectively insulated by the water at the top.

To maximize the amount of heat radiating into the ball and minimize the heat leaving the ball, an inner surface 32 of bottom portion 30 is dark and an outer surface 34 of bottom portion 30 is coated with reflective material. It is understood that the dark and reflective portions may, but need not be, coextensive.

Reservoir 14 includes feet 36 to stabilize it so that it may serve as ballast to hold frame 12 upright. Although not illustrated, reservoir 14 may be provided with a handle to improve the ease of transportability.

Frame 12 is generally comprised of conduits 24, 24', first ends 38, 38' of which are detachably mounted within and in fluid communication with reservoir 14, and second ends 39, 39' of which extend away from the reservoir and are mounted to and in fluid communication with a showerhead 40. Conduits 24, 24' are preferably PVC pipes or the like and most preferably bend away from reservoir 14 as they extend therefrom to deliver water to an area adjacent the reservoir.

Conduit 24 delivers solar-heated water from reservoir 14, and conduit 24' delivers temperature-blending water from source 26 for mixing at shower head 40. Preferably, a valve 42 mounted in conduit 24' in fluid communication between source 26 and shower head 40 permits control of a rate of flow of temperature-blending or cold water to adjust both a temperature and a pressure of water leaving the shower head. It is understood that increasing the rate of flow of temperature-blending water will generally reduce the temperature of and increase the pressure of the shower water. Preferably, valve 42 is hand-operated via knob 43, advantageously permitting adjustment of shower temperature and/or pressure during a solar shower.

Although not strictly necessary, conduit 24 may also include a valve 44 mounted in fluid communication between reservoir 14 and shower head 40 to permit control of a rate of flow of solar-heated water for adjustment of both the pressure and the temperature of water leaving the shower head. It is understood that increasing the rate of flow of solar-heated water will generally increase both the temperature and the pressure of the shower water. Preferably, valve 44 is also hand-operated via knob 45, advantageously permitting adjustment of shower temperature and/or pressure during a solar shower.

In shower 10 designs which include a valve 44 in solar-heated water conduit 24, a restrictor valve 46 is preferably also included in conduit 24' in fluid communication between pressurized source 26 and valve 42. Restrictor valve 46 functions to reduce a drop in pressure in solar-heated water conduit 24 which occurs upon opening of valve 42 in temperature-blending water conduit 24'.

Conduits 24, 24' are connectable into frame 12 by crossbars 48, 48'. Shower head 40 is mounted to crossbar 48 which is a pipe mounted in fluid communication to conduits 24, 24'. Pipe 48 combines the conduits for mixing of solar-heated and temperature-blending water in shower head 40 into shower water having a temperature and a pressure which are adjustable during the shower. Crossbar 48' connects conduits 24 and 24' only to improve the structural integrity of frame 12. No water flows into crossbar 48'. Crossbar 48' is preferably located in the vicinity of hand knobs 43, 45 and conveniently includes a tray, dish or pocket 50 for holding shower accessories or personal items. Pocket 50 may be waterproof if desired.

In addition to being a freestanding, pressurized solar shower as distinguished from a hanging, gravity solar shower, shower 10 is also preferably portable. In this regard, pressurized source 26 is connected, preferably detachably, to conduit 24' via coupling 52 as illustrated in FIG. 3. Pressurized source 26 is preferably a garden hose 54 having an end fitting 56 threaded on its outside surface. A T-shaped section 58 of conduit 24' mounted between pipes thereof (not shown in FIG. 3, see FIG. 1) includes a cap 60 threaded on its inner surface for receiving hose fitting 56 in screw engagement. Cap 60 is mounted to T-shaped section 58 with a hollow bolt 64 which has a threaded outer surface for screw engagement with T-shaped section 58, and a sloping flange 66 for sealing to a similarly sloped surface within cap 60.

Source 26 pressurizes conduit 24' as well as reservoir 14 and conduit 24. In order to keep the warmest water in conduit 24, end 24 thereof only extends to a top portion 28 of reservoir 14. Conversely, to speed the warming and mixing of water entering reservoir 14 from source 26, end 38' of conduit 24' extends to a bottom portion 30 of reservoir 14. Further, end 38' includes a plurality of holes 68 through sidewall 70 (see FIG. 4) which serve to disburse incoming water throughout bottom portion 30 of reservoir 14. The pressurized force of water entering reservoir 14 causes the water to flow up the warmed, curved inner surface 32 of the reservoir to speed mixing and thereby warming. Preferably, the bottom 72 of conduit 24' is at least partially blocked by a screen or the like to create turbulence in the incoming water flow and stimulate mixing.

Referring to FIG. 2, a sleeve 74 may be removably fitted over frame 12 to customize shower 10 with either a promotional message, a graphical design, or simply for the privacy of a user. Sleeve 74 includes cutouts 76 for knobs 43, 45, shower head 40, T-shaped section 58 and/or tray or pockets 50 as necessary. It is understood that if sleeve 74 is used for advertising it may be desirable to omit a cut-out portion 76 for tray or pockets 50. Preferably, sleeve 74 is made with reasonably wind porous material—without seriously degrading the quality of the customizing image—to maintain the stability of the shower for use in windy locations such as the beach.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A solar shower comprising:

a reservoir for solar-heating and storing water said reservoir serving as base to provide stability to the shower;

a first conduit having a first end mounted in fluid communication with said reservoir, a first valve mounted within said first conduit for controlling a rate of flow of solar-heated water through said first conduit;

a second conduit having a first end mounted in fluid communication with said reservoir, said first and second conduits detachably mounted to said reservoir for relatively quick and easy removal to transport the shower, said first and second conduits extending upwardly out of said reservoir;

a second valve mounted within said second conduit for controlling a rate of flow of temperature-blending water through said second conduit;

a shower head mounted in fluid communication with second ends of said solar-heated and temperature-blending water conduits for mixing the solar-heated and temperature-blending water into shower water; and said first and second valves permitting adjustment of a temperature of the shower water mixed at said shower head.

2. The solar shower of claim 1 including a source of temperature-blending water removably connected in fluid communication to pressurize said first and second conduits, and said reservoir.

3. The solar shower of claim 2 wherein said reservoir is a unitary one piece sphere capable of holding water under a constant pressure in the range of 30–60 psi.

4. The solar shower of claim 2 wherein said source of temperature-blending water is a hose.

5. The solar shower of claim 4 wherein said hose is connected to said second conduit.

6. The solar shower of claim 5 wherein said hose is connected to said conduit between said second valve and said reservoir.

7. The solar shower of claim 2 including a restrictor valve mounted in said second conduit between said pressurized source and said second valve to reduce a pressure drop in said first conduit upon opening said second valve.

8. The solar shower of claim 1 wherein said first and second conduits and said showerhead form a frame, and including a sleeve removably, replaceably fitting over said frame for customization of the shower.

9. A solar shower comprising:

a reservoir for solar-heating and storing water;

a first conduit having a first end mounted in fluid communication with said reservoir, a first valve mounted within said first conduit for controlling a rate of flow of solar-heated water through said first conduit;

a second conduit having a first end mounted in fluid communication with said reservoir, said first and second conduits extending upwardly out of said reservoir and wherein said reservoir serves as base to provide stability to the shower;

a second valve mounted within said second conduit for controlling a rate of flow of temperature-blending water through said second conduit;

a shower head mounted in fluid communication with second ends of said solar-heated and temperature-blending water conduits for mixing the solar-heated and temperature-blending water into shower water; and said first and second valves permitting adjustment of a temperature of the shower water mixed at said shower head.

10. The solar shower of claim 9 including a source of temperature-blending water removably connected in fluid communication to pressurize said first and second conduits, and said reservoir.

11. The solar shower of claim 10 wherein said source of temperature-blending water is a hose.

12. The solar shower of claim 11 wherein said hose is connected to said second conduit.

13. The solar shower of claim 11 wherein said hose is connected to said conduit between said second valve and said reservoir.

14. A solar shower comprising:

a reservoir for solar-heating and storing water;

a first conduit having a first end mounted in fluid communication with said reservoir, a first valve mounted within said first conduit for controlling a rate of flow of solar-heated water through said first conduit;

a second conduit having a first end mounted in fluid communication with said reservoir, said first and second conduits extending upwardly out of said reservoir and wherein said reservoir serves as base to provide stability to the shower;

a second valve mounted within said second conduit for controlling a rate of flow of temperature-blending water through said second conduit;

a shower head mounted in fluid communication with second ends of said solar-heated and temperature-blending water conduits for mixing the solar-heated and temperature-blending water into shower water;

said first and second valves permitting adjustment of a temperature of the shower water mixed at said shower head; and said first and second conduits and said showerhead forming a frame, and including a sleeve removably, replaceably fitting over said frame for customization of the shower.

15. The solar shower of claim 14 including a source of temperature-blending water removably connected in fluid communication to pressurize said first and second conduits, and said reservoir.

16. The solar shower of claim 15 wherein said source of temperature-blending water is a hose.

17. The solar shower of claim 16 wherein said hose is connected to said second conduit.

18. The solar shower of claim 14 wherein said reservoir is a unitary one piece sphere capable of holding water under a constant pressure in the range of 30–60 psi.

* * * * *